US012691650B2

(12) United States Patent
Pesi

(10) Patent No.: US 12,691,650 B2
(45) Date of Patent: Jul. 28, 2026

(54) METHOD TO MANUFACTURE A MOLD FOR LENSES, AND CORRESPONDING MOLD

(71) Applicant: LEONARDO VISION S.R.L., Montecatini-Terme (IT)

(72) Inventor: Leonardo Pesi, Montecatini-Terme (IT)

(73) Assignee: LEONARDO VISION S.R.L., Montecatini-Terme (IT)

( * ) Notice: Subject to any disclaimer, the term of this patent is extended or adjusted under 35 U.S.C. 154(b) by 208 days.

(21) Appl. No.: 18/578,898

(22) PCT Filed: Jul. 13, 2022

(86) PCT No.: PCT/IT2022/050204
§ 371 (c)(1),
(2) Date: Jan. 12, 2024

(87) PCT Pub. No.: WO2023/286099
PCT Pub. Date: Jan. 19, 2023

(65) Prior Publication Data
US 2024/0300198 A1      Sep. 12, 2024

(30) Foreign Application Priority Data

Jul. 13, 2021      (IT) ........................ 102021000018356

(51) Int. Cl.
*B29D 11/00*          (2006.01)
*B29C 33/38*          (2006.01)
(Continued)

(52) U.S. Cl.
CPC .... *B29D 11/00096* (2013.01); *B29C 33/3842* (2013.01); *B29C 33/424* (2013.01);
(Continued)

(58) Field of Classification Search
CPC ........ B29D 11/00096; B29D 11/00326; B29D 11/00519; B29D 11/00807; B29C 33/3842; B29C 33/424
See application file for complete search history.

(56) References Cited

U.S. PATENT DOCUMENTS

| | | | | |
|---|---|---|---|---|
| 4,209,289 A | * | 6/1980 | Newcomb ............. | B29C 33/005 249/117 |
| 2010/0109176 A1 | | 5/2010 | Davison | |
| 2013/0043609 A1 | * | 2/2013 | Suzuki ............. | B29D 11/00038 264/1.37 |

FOREIGN PATENT DOCUMENTS

| | | |
|---|---|---|
| EP | 2458427 A1 | 5/2021 |
| KR | 102061813 B1 | 1/2020 |

OTHER PUBLICATIONS

International Search Report and Written Opinion of PCT/IT2022/050204 dated Nov. 10, 2022, 17 pages.

* cited by examiner

*Primary Examiner* — Mathieu D Vargot
(74) *Attorney, Agent, or Firm* — Rankin, Hill & Clark LLP

(57) ABSTRACT

The invention concerns a method to manufacture a mold (10) for forming contact lenses (100) using the technique of molding with molds of monomeric and/or polymeric material; such molds (10) comprise a male element (11) and a female element (12), which cooperate to define a cavity suitable to accommodate monomeric and/or polymeric material in the liquid state intended to form the lens (100), wherein the method provides to obtain, by means of laser processing, a plurality of grooves (23) in the male element (11) intended to form functional elements in relief (101) of the lenses (100). The invention also concerns a mold (10) for (Continued)

contact lenses (100) made of monomeric and/or polymeric material that can be obtained with the method as above.

20 Claims, 4 Drawing Sheets

(51) Int. Cl.
   *B29C 33/42*          (2006.01)
   *B29L 11/00*          (2006.01)
   *B29L 31/00*          (2006.01)
(52) U.S. Cl.
   CPC .. *B29D 11/00326* (2013.01); *B29D 11/00519*
        (2013.01); *B29D 11/00807* (2013.01); *B29K*
            *2823/12* (2013.01); *B29L 2011/0041*
            (2013.01); *B29L 2031/757* (2013.01)

METHOD TO MANUFACTURE A MOLD FOR LENSES, AND CORRESPONDING MOLD

FIELD OF THE INVENTION

Embodiments described here concern a method to manufacture a mold for lenses equipped with functional elements, and the corresponding mold, of monomeric or polymeric material, manufactured by means of this method. The forming mold of the present invention is particularly suitable to be used to manufacture a contact lens by means of the molding technique.

BACKGROUND OF THE INVENTION

It is well known in the state of the art to produce lenses by molding them inside a suitably shaped mold.

The step of manufacturing the mold requires an engineering and development step which is usually very expensive and laborious.

It is also known that contact lenses, depending on the materials of which they are made, are substantially divided into soft and rigid lenses.

It is also known that contact lenses can be classified on the basis of geometry, which allows to obtain different functions of the lens. For example, the lenses can be spherical, if both of its surfaces have a fixed curvature, aspherical or spherical-aspherical, if one or both surfaces have different centers of curvature, toric, if the two main meridians have different radii of curvature, or still others.

The manufacturing of soft contact lenses by molding provides to use a mold formed by two parts, called in jargon "male" and "female". The liquid material is put in the cavity and is then polymerized, forming a complete lens that can be removed from the mold. The molding technique has good reproducibility of the objects and allows to obtain smooth surfaces, even with limited thicknesses, and also to produce high and medium hydration lenses.

Known molds are generally single-use, economical, stable on a dimensional level and, above all, their production process is repeatable, allowing to obtain a good dimensional accuracy of the molds.

However, known methods do not provide to make molds which allow to obtain lenses with very complex or particular shapes.

In particular, lenses that integrate functional elements that allow the lens to have other functions, in addition to the sole compensation of the visual defect, are spreading more and more rapidly.

To this end, the functional elements of these lenses can comprise electrical/electronic components, for example sensors, data transmission members, or suchlike. In fact, the continuous monitoring of biological parameters, such as glucose level, heartbeat, pH, or suchlike, and the possibility of continuous treatment of pathologies, through the continuous administration of medications, or at controlled intervals, are of increasing interest. This can also be achieved by analyzing the tear film or by contact with the ocular surface, and also because certain drugs can be administered via the ophthalmic route.

Patent application EP-A1-2458427 describes a method to manufacture a mold for making lenses, the mold comprising a male element and a female element. Both the male element and also the female element can be worked by laser, in some predetermined zones, in order to make grooves such as to create periodic patterns on the lens, for example, concentric circular grooves or straight lines. These periodic patterns are not suitable to house electrical/electronic components for the continuous monitoring of biological parameters. Furthermore, in the mold described, the convex part of the male element and the corresponding concave part of the female element have a single radius of curvature.

There is therefore a need to perfect a method to manufacture forming molds, and a corresponding re-usable mold, cleaner than in the state of the art, which can overcome at least one of the disadvantages of the state of the art and which allows to make molds for lenses with very complex or particular shapes, also suitable to house functional elements.

One purpose of the present invention is to perfect a method which allows to construct re-usable molds by means of which contact lenses are made with a shape such that it allows functional elements to be housed.

One purpose of the present invention is to allow to create construction or manufacturing details on the lenses, even of very small sizes, for example in the order of tens of micrometers.

Another purpose of the present invention is to perfect a very precise and highly repeatable method.

Furthermore, another purpose is to allow to quickly and simply adapt the production of the molds, of monomeric or polymeric material, to different shapes and sizes of the lenses.

Another purpose is to perfect a method to manufacture re-usable molds which is rapid and efficient.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, and in order to resolve the technical problem disclosed above in a new and original way, also achieving considerable advantages compared to the state of the prior art, a method to manufacture a mold for forming contact lenses equipped with functional elements according to the present invention provides to manufacture a male element and a female element.

Some embodiments described here also concern a mold made of monomeric or polymeric material for manufacturing contact lenses using the molding technique.

The mold comprises a male element and a female element, respectively with a convex surface and a concave surface, which define a cavity suitable to accommodate monomeric or polymeric material in the liquid state destined to form the lens.

In particular, the molds in question are suitable to be re-used even for hundreds of molding cycles before their wear determines the necessary replacement.

The convex and concave surfaces have at least two concentric zones, one internal and the other external, with different radii of curvature. The internal zone is advantageously substantially circular in shape, the external zone is advantageously substantially annular in shape.

The external zone of the convex surface, which has a larger diameter, comprises a plurality of grooves mating in shape and size with functional elements in relief to be made on the surface of the lenses. These elements are preferably configured to at least partly house functional elements suitable to monitor physiological parameters or to actuate a controlled release administration of drugs, for example over time.

Advantageously, it is therefore possible to create construction or manufacturing details on the lenses, in particular, but not only, integrating the functional elements, which have even very small sizes, for example in the order of tens of micrometers.

It is also possible to manufacture contact lenses with a shape that allows to house functional elements, even with complex or particular shapes.

The grooves of the mold can house functional elements suitable to monitor physiological parameters or to actuate a controlled release administration of drugs, for example over time. Advantageously, the grooves can be parallelepiped or circular in shape. The grooves can be divided into two separate parts, so as to maintain a certain flexibility of the lens in correspondence with the corresponding functional element.

According to some embodiments, the mold can comprise, in correspondence with the external zone of the concave surface of the female element, at least one projecting element mating in shape and sizes with at least one recessed element to be made on the front surface of the lenses.

Advantageously, in this way it is possible to manufacture at least one recessed element on the front surface of the lens, that is, the surface of the lens that does not rest on the eyeball. This recessed element is suitable to separate two distinct parts of the functional elements in relief, and thus allows to increase the flexibility of the lens, allowing it to better adapt to the ocular surface.

The male element and the female element of the mold can in turn be obtained by molding using a forming matrix made of metal material, or by using high precision numerically controlled lathes.

In accordance with some embodiments, the mold also provides a tubular support element inserted around one of either the male element or the female element and configured to interfere with at least part of an internal wall of the other element, that is, of the other one of either the male element or the female element.

Advantageously, the support element has a truncated conical external lateral surface. More advantageously, the truncated conical external lateral surface has the convergence facing toward the element that has the internal wall with which the support element is configured to interfere. Even more advantageously, this internal wall has at least one inclined portion so as to couple with the external surface of the support element, preferably by interference or same-shape coupling.

Preferably, the support element is made of a plastic material that has greater deformability than the material with which the mold is made. More preferably, the support element is made of polypropylene. The mold can be made of PEEK, Teflon or RADEL polyphenylsulfone.

Advantageously, the method to manufacture the male and female elements can therefore be both rapid and efficient.

According to the invention, the method provides laser processing to make a plurality of grooves on the male element, which are necessary to obtain the functional elements in relief described above. According to one example embodiment, the grooves can have shapes and sizes that are mating with, or complementary to, the functional elements in relief to be made on the surface of the lens.

The laser processing preferably provides to use a femtosecond type laser, which allows to reduce the heating and deformation of the material, thus making the method very precise and highly repeatable.

In fact, the laser processing allows to produce a multitude of grooves uniformly distributed on a surface of the male element, in particular on a convex surface, or only on a part of such surface. In addition, the grooves obtained will have reduced sizes, for example of the order of one micron.

Preferably, the grooves are made transversely, more preferably perpendicularly, to the surface of the male element.

The laser processing also allows to avoid producing fine dusts or particulates, which are usually generated by mechanical processing with removal of material.

The dusts are, in fact, harmful both for human health and also for the plants themselves, in particular for the precision mechanisms, which for example can be damaged in the long run by deposit of dusts, generally increasing the dispersion of the metrological parameters of the production process.

Advantageously, this processing allows to obtain molds by means of which to produce lenses with complex geometries.

For example, by means of laser processing it is possible to obtain molds that allow to manufacture lenses that integrate functional elements in relief that have sizes of a few micrometers.

The molds can also allow to manufacture any known type of lens whatsoever, for example spherical and/or toric and/or multifocal lenses.

With the laser processing it is possible to quickly and simply adapt the production of the molds of polymeric material to different shapes and sizes, by changing the settings of the control system of the laser processing apparatus.

The method can also provide to obtain, by means of laser processing, a plurality of concave elements at least in part of the internal zone, that is, the zone that has a smaller diameter, of the convex surface. The concave elements can be mating in shape with constructive elements in relief to be made on the surface of the lenses.

The mold therefore allows to manufacture lenses which, by coming into contact with the surface of the eyeball only in correspondence with the constructive elements in relief, allow the tear fluid to move optimally between the surface of the eye and the internal surface of the lens. In this way, the tear fluid can more easily reach the functional elements of the lens and fulfill its function of nourishing and hydrating the ocular structures.

Any drugs contained in the functional elements can more easily reach all the zones of the eye, both central and peripheral, and, in the same way, any substances contained in the tear fluid can reach the functional elements which, if for example they contain sensors, can detect the physiological parameters.

DESCRIPTION OF THE DRAWINGS

These and other aspects, characteristics and advantages of the present invention will become apparent from the following description of some embodiments, given as a non-restrictive example with reference to the attached drawings wherein.

Figures 1, 2, 2A, 2B, 3A, 3B, 3C:
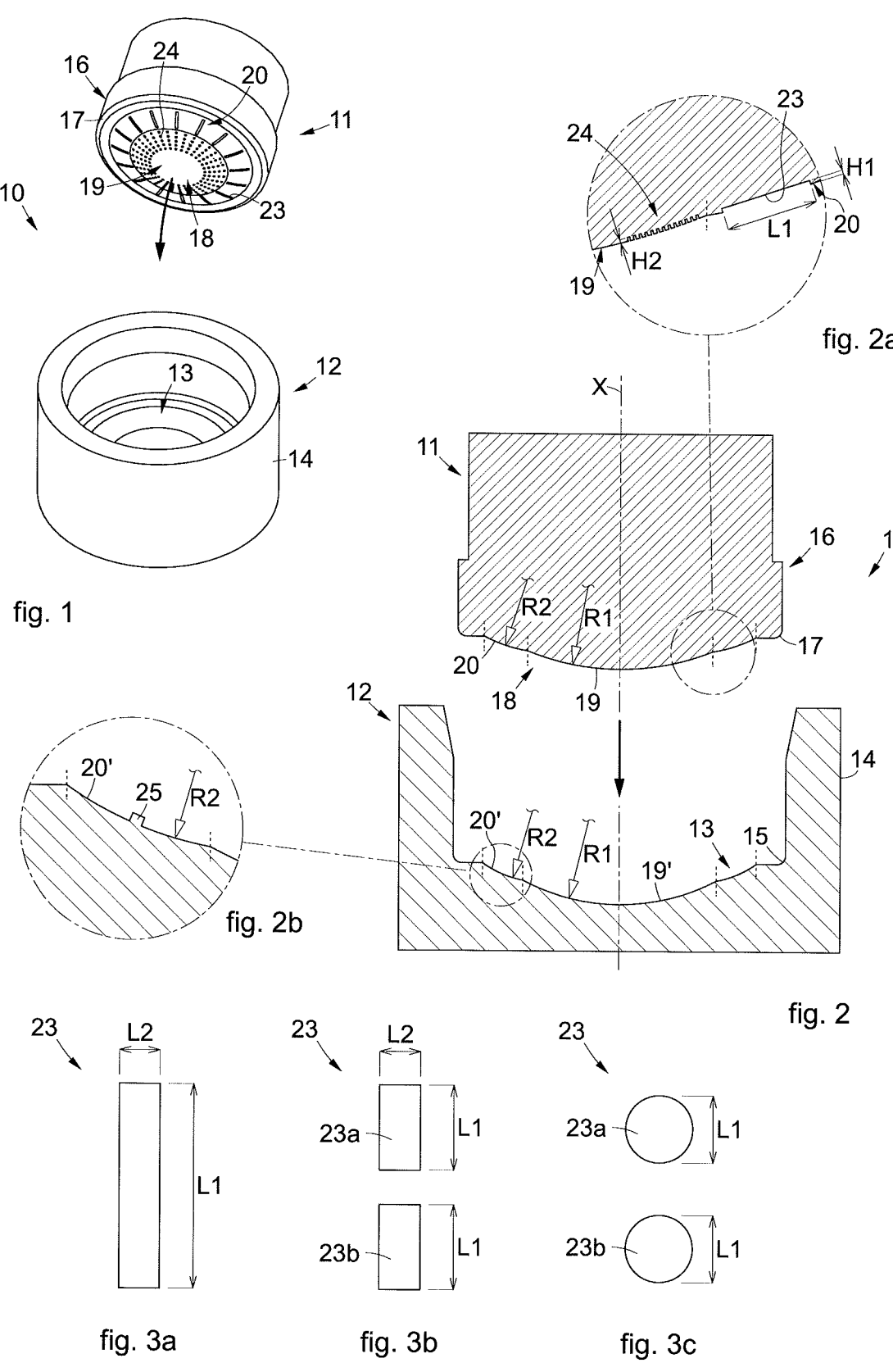
FIG. 1 is a three-dimensional view of a mold according to the invention in accordance with one embodiment described here.
FIG. 2 is a section view of the mold according to the invention of FIG. 1.
FIGS. 2a and 2b are enlarged views of the section of FIG. 2.
FIGS. 3a, 3b, 3c are top views of the grooves of the mold according to the invention, in accordance with the embodiments described here.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to the attached drawings, there is described a mold 10 of monomeric and/or polymeric material for manufacturing contact lenses 100 using the molding technique.

According to some embodiments and in a known way, the mold 10 comprises a male element 11 and a female element 12.

The male element 11 and the female element 12 extend axially-symmetrically around a central axis X.

The female element 12 is suitable to accommodate monomeric and/or polymeric material in the liquid state, and to cooperate with the male element 11 to form the material into the shape desired for the lens 100.

According to some embodiments, the female element 12 has a concave surface 13 and it can also comprise an external wall 14 and positioning means 15.

The concave surface 13 can be suitable to contain the monomeric and/or polymeric material in the liquid state and to form the front surface of the lens 100, defining its front curvature, that is, that surface of the lens 100 that does not rest on the eyeball.

The concave surface 13 has a shape correlated to that of the lens, for example having a spherical, aspherical, toric shape and suchlike.

The positioning means 15 allow to correctly position the male element 11 with respect to the female element 12, and they can have a shape at least partly mating with the shape of one or more positioning elements 16 present on the male element 11, advantageously creating a same-shape coupling between the elements 11, 12.

The positioning means 15 can comprise a rest edge defined by the space between the concave surface 13 and the external wall 14. The positioning elements 16 can abut on the rest edge.

In alternative embodiments, the positioning means 15 can for example comprise interlocking elements suitable to close onto the one or more positioning elements 16, which can for example be conformed with a single annular projection that extends circumferentially along the entire perimeter of the male element 11. The positioning elements 16 can comprise an abutment edge 17, suitable to abut on the positioning means 15.

It is understood that the positioning elements 16 can be straight or concave, and/or vertical or inclined. The abutment edge 17 can be horizontal or inclined.

The male element 11 has a convex surface 18 suitable to define the rear surface of the lens 100, defining its rear curvature, that is, the surface of the lens 100 intended to rest on the eyeball. In the examples provided here, the convex surface 18 is mating in shape with the concave surface 13. For example, the convex surface 18 and the concave surface 13 can have exactly the same conformation, this resulting in a lens having a uniform thickness throughout its entire development.

In some variants, the convex surface 18 and the concave surface 13 can have a profile at least partly different, if the lens to be formed provides zones of different thickness.

In the embodiment shown in FIGS. 1 and 2, the convex surface 18 of the male element 11 comprises an internal zone 19 and an external zone 20.

Figures 4, 4A, 5, 5A, 6, 6A:
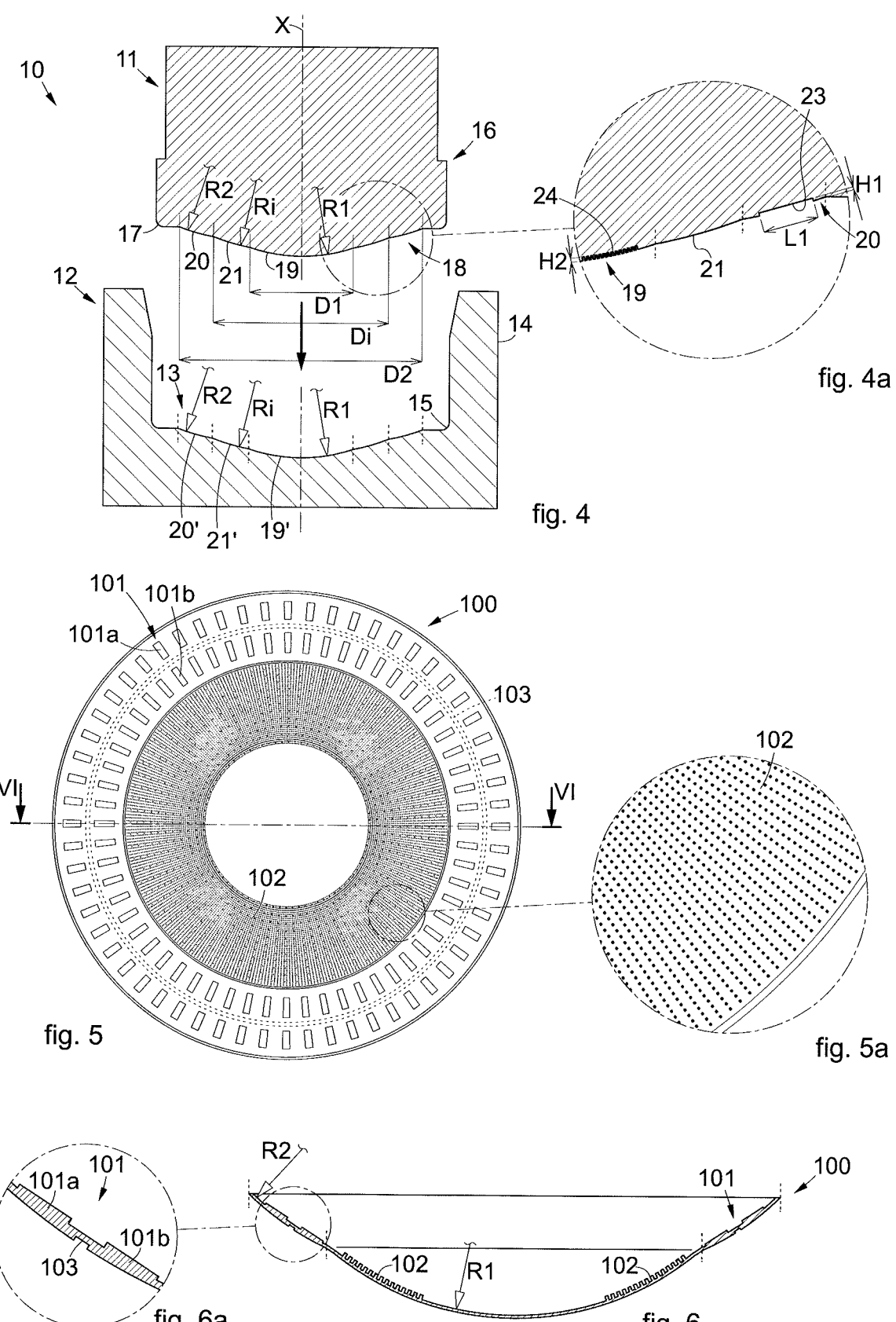
FIG. 4 is a section view of a mold according to the invention, in accordance with another embodiment described here.
FIG. 4a is an enlarged view of the section of FIG. 4.
FIG. 5 is a rear view of a contact lens obtained by means of polymeric molds for forming contact lenses with functional elements in accordance with the embodiment of FIG. 2.
FIG. 5a is an enlargement of a part of the contact lens of FIG. 5.
FIG. 6 is a section view of the contact lens of FIG. 5 taken according to a section plane with outline VI-VI of FIG. 5.
FIG. 6a is an enlargement of a part of the section view of the contact lens of FIG. 6.

In the embodiment shown in FIG. 4, in addition to the internal zone 19 and to the external zone 20, the convex surface 18 of the male element 11 comprises an intermediate zone 21 of transition between the internal zone 19 and the external zone 20

Each of the internal and external zones 19, 20, as well as—if provided—the intermediate zone 21, extends symmetrically around the central axis X. The internal zone 19 has a circular perimeter, while the zones 20 and 21 are conformed as circular crowns.

The internal zone 19 is intended to form the surface of the lens 100 suitable to be disposed in correspondence with the pupil and the iris.

By way of a non-limiting example, the diameter D1 of the internal zone 19 is comprised between 11.50 mm and 12.50 mm, preferably approximately equal to 11.80 mm, while the radius of curvature R1 of the internal zone 19 is comprised between 6.50 mm and 9.50 mm.

The external zone 20 is intended to form the surface of the lens 100 suitable to be disposed in correspondence with the sclera.

For example, the maximum diameter D2 of the external zone 20 is comprised between 13.50 mm and 16.00 mm, preferably approximately equal to 15.00 mm.

In the embodiment in which the intermediate zone 21 is present, this extends between a lower diameter, coinciding with the diameter D1, and an upper diameter, indicated with Di in the attached drawings, coinciding in turn with a minimum diameter of the external zone 20. By way of a non-limiting example, the upper diameter Di (that is, the minimum diameter of the external zone 20) is comprised between 11.50 mm and 13.50 mm, preferably equal to approximately 12.80 mm.

Please note that, if the lower diameter (coinciding with D1) and the upper diameter Di coincide, the embodiment of FIGS. 1 and 2 is obtained, in which the intermediate zone 21 is absent and the internal zone 19 and the external zone 20 are separated only by a circumferential line.

The external zone 20 has a radius of curvature R2 which is larger than a radius of curvature R1 of the internal zone 19.

In one embodiment, in which the lens 100 has an eccentricity of 0.40, the difference between the radii of curvature R2 and R1 is comprised between 1 and 6 mm, preferably equal to 4 mm.

If the intermediate zone 21 is present, it has a radius of curvature Ri which is larger than the radius of curvature R2 of the external zone 20, and consequently it is also larger than the radius of curvature R1 of the internal zone 19. In one embodiment, in which the lens 100 has an eccentricity of 0.40, the difference between the radii of curvature R1 and R1 is comprised between 2 and 8 mm, preferably equal to 6 mm.

Similarly, in the embodiment shown in FIGS. 1 and 2, the concave surface 13 of the female element 12 comprises an internal zone 19' and an external zone 20'. In the embodiment shown in FIG. 4, in addition to the internal zone 19' and to the external zone 20', the concave surface 13 of the female element 12 comprises an intermediate zone 21' of transition between the internal zone 19' and the external zone 20'.

The convex surface 18 comprises a plurality of grooves 23, which can be schematically seen in FIG. 1, in which they have been shown exaggeratedly enlarged for reasons of clarity, as well as in the enlargements of FIGS. 2a and 4a.

The grooves 23 are disposed in the external zone 20 of the convex surface 18, and they are intended to form functional elements in relief 101 on the rear surface of the lens 100.

The grooves 23 can be, or not be, homogeneously distributed on the convex surface 18. For example, the grooves 23 are homogeneously distributed on the entire external zone 20, for example in such a way that each one is disposed along a respective radial directrix exiting from the central axis X.

The grooves 23 can be configured as blind holes or similar cavities, preferably with micrometric sizes.

The grooves 23 are suitable to form, on the surface of the molded lens 100, functional elements in relief 101 mating in shape with the grooves 23, which can be schematically seen in FIG. 6, in which they have been shown exaggeratedly enlarged for reasons of clarity, as well as in FIGS. 5 and 5a. The functional elements in relief 101 can be configured in various ways, for example as sensors, in particular configured to detect the presence of a determinate physiological parameter in the tear fluid, such as glucose, pH or any other parameter of biological interest whatsoever, or as a reservoir containing a liquid of interest, for example artificial tears or medical liquids or eye drops, which is gradually released into the eye to carry out the slow-release treatment provided.

The grooves 23 are present in a number comprised between 2 and 340, the number of the grooves 23 being correlated to their sizes as well as to the sizes of the lens 100. With reference to FIGS. 3a, 3b and 3c, different possible embodiments of the grooves 23 are shown.

In a first embodiment (FIG. 3a), the groove 23 has a parallelepiped shape, which by way of example has a length L1 comprised between 700 μm and 2000 μm, preferably equal to about 1400 μm, a width L2 between 160 μm and 900 μm, preferably equal to about 500 μm, and a height H1

(FIGS. 2a and 4a) comprised between 5 μm and 25 μm, preferably equal to about 15 μm.

In a second embodiment (FIG. 3b), the groove 23 is divided into two separate parts 23a and 23b, both in the shape of a parallelepiped. In this embodiment, these two parts are configured to form a single functional element in relief 101 since they are operatively connected, for example by a sensor element. In this embodiment, each part 23a or 23b has by way of example a length L1 comprised between 350 m and 1000 μm, preferably equal to about 700 μm, a width L2 between 80 μm and 450 μm, preferably equal to about 250 μm, and a height H1 (FIGS. 2a and 4a) comprised between 5 μm and 25 μm, for example equal to about 15 μm.

The division of the groove 23 into two separate parts allows to maintain a certain flexibility of the lens 100 in correspondence with the functional element in relief 101, which allows the external zone 20 to better adhere to the eyeball.

In a third embodiment (FIG. 3c), the groove 23 is always divided into two parts that are separate but operatively connected to each other, for example by means of the sensor element 32, as in FIG. 3b, but each part has a circular shape.

In the three embodiments described above, the grooves 23 are configured to create protuberances on the lens which are capable of at least partly housing a functional element which can be, for example, a sensor element or an element for the controlled release of liquid substances. In particular, a functional element can be stably inserted in one parallelepiped-shaped protuberance, or partly inserted in two separate parallelepiped-shaped or circular-shaped protuberances.

Please note that, in other variants, not shown, each groove 23 can be formed by at least one element, or by at least two parts, wherein such element/such parts can have any shape whatsoever, according to requirements. The person of skill in the art will be perfectly capable of appropriately sizing each element/part starting from the teachings of the present invention, also taking into consideration the sizes of the lens 100 as a whole and of the external zone 20.

According to some embodiments, as better visible in the enlargement of FIG. 2b, the mold comprises, in correspondence with the external zone 20' of the concave surface 13 of the female element 12, at least one projecting element 25.

Preferably, the projecting element 25 can be a single element that forms a continuous ring on the concave surface 13. According to some embodiments not shown in the drawings, the projecting element 25 is configured as a plurality of sectors, each one conformed as an arc of a circle on the concave surface 13.

By way of example, the projecting element 25 can have a width, measured in the radial direction, comprised between 60 and 300 μm, for example about 150 μm, and a height comprised between 5 and 60 μm, for example 30 μm.

The projecting element 25 can have shape and sizes mating with at least one recessed element 103 to be made on the surface of the lenses 100, as shown in FIGS. and 6a. In particular, the at least one recessed element 103 is made on the front surface of the lens 10.

Preferably, if the projecting element 25 is a single element that forms a ring, the groove 23 takes the form of the embodiment described above with reference to FIG. 3b, being divided into two separate parts 23a and 23b.

In this case, the lens 100 has functional elements in relief 101 divided into two distinct parts 101a and 101b, as shown in FIGS. 5 and 6a, separated from each other in correspondence with the recessed element 103.

The convex surface 18 also has a plurality of concave elements 24 on its surface, which are schematically visible in FIG. 1, in which they have been shown exaggeratedly enlarged for reasons of clarity, as well as in the enlargements of FIGS. 2*a* and 4*a*.

The concave elements 24 can be, or not be, homogeneously distributed on the convex surface 18. In a preferred embodiment, the concave elements 24 are homogeneously distributed over the entire internal zone 19, for example according to a geometric pattern defined by a plurality of rows radiating from the central axis X.

The concave elements 24 can be configured as blind holes or similar cavities, preferably of micrometric sizes, and they are suitable to form, on the surface of the molded lens 100, constructive elements 102 mating in shape with the concave elements 24, schematically visible in FIG. 6, in which they have been shown exaggeratedly enlarged for reasons of clarity, as well as in FIGS. 5 and 5*a*.

In the examples described here, the elements 102 have micrometric sizes and are conformed as micro-protuberances, also called "pillars" or "micro-pillars", which protrude from the internal surface of the lens 100 in such a way as to be facing, during use, toward the eye in order to keep the contact lens slightly raised from the corneal surface.

For example, this raising of the lens with respect to the corneal surface, in its entirety or at least with respect to some portions thereof, advantageously allows a better oxygenation of the eye, allowing the formation of micro-channels for circulation of the tear fluid and/or allowing a better movement of the lens on the eye, in particular for lenses 100 with a small thickness.

The concave elements 24 can have transverse sizes (that is, diameters if they are cylindrical, or maximum overall sizes) comprised between 1 µm to 500 µm, preferably between 20 µm and 300 µm.

The concave elements 24 can have a constant or variable height. Furthermore, concave elements 24 of different heights can be provided in different zones of the mold.

For example, the maximum height H2 of the concave elements 24 can be comprised between 5 µm and 25 µm, preferably equal to 10 µm. These heights allow to obtain micro-protuberances of the same height, which substantially corresponds to the thickness of the tear film, usually comprised between 8.5 µm and 9.5 µm.

The distance between the respective center of two adjacent concave elements 24 can be comprised between 30 µm and 500 µm, preferably between 60 µm and 140 µm, more preferably equal to 100 µm. This distance can be comprised between one and four times the maximum height H2 of the concave elements 24, preferably comprised between one and three times the height H2.

In one embodiment, the concave elements 24 can have, in the part furthest away from the surface of the lens 100, a beveled shape in order to generate corresponding elements in the lens with a beveled or rounded shape. In another embodiment, the concave elements 24 can have a tapered shape.

The lateral walls of the concave elements 24 are oriented, with respect to the convex surface 18, in such a way as to form with the latter an angle comprised between 800 and 100°, preferably between 85° and 95°, even more preferably of substantially 90°.

Advantageously, the number of concave elements 24 can vary between 300 and 65,000, preferably between 2,000 and 20,000, more preferably between 5,000 and 8,000, thus allowing to manufacture lenses 100 provided with a corresponding number of constructive elements 102, in a number such as to guarantee a good oxygenation of the part of the eye under the lens 100.

Preferably, the concave elements 24 have a cylindrical, truncated cone or paraboloid, symmetrical or asymmetrical, shape. In particular, the concave elements 24 preferably have a base and a bottom. The diameter of the base and of the bottom can be comprised between 5 and 255 µm. Advantageously, the bottom of the concave elements 24 has a curvature, preferably a concavity, with a radius of curvature comprised between 30 and 5,000 µm. In this way, a constructive element 102 is formed with a top having a convex surface that is particularly suitable to rest on the surface of an eye.

It is understood that in other embodiments, the male element 11 can only have the grooves 23 in the external zone 20, but be without the concave elements 24 in the internal zone 19.

Figure 7A:
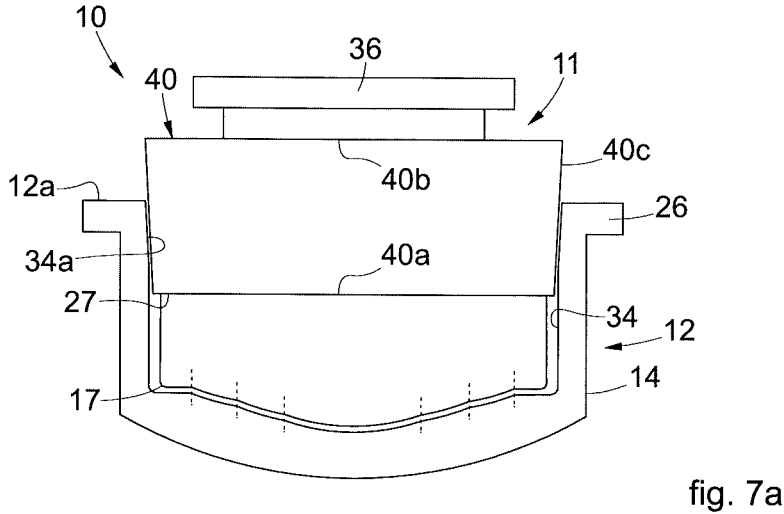
FIGS. 7a and 7b are front views of a variant of the mold, FIG. 7b being an exploded view.
Figure 7B:
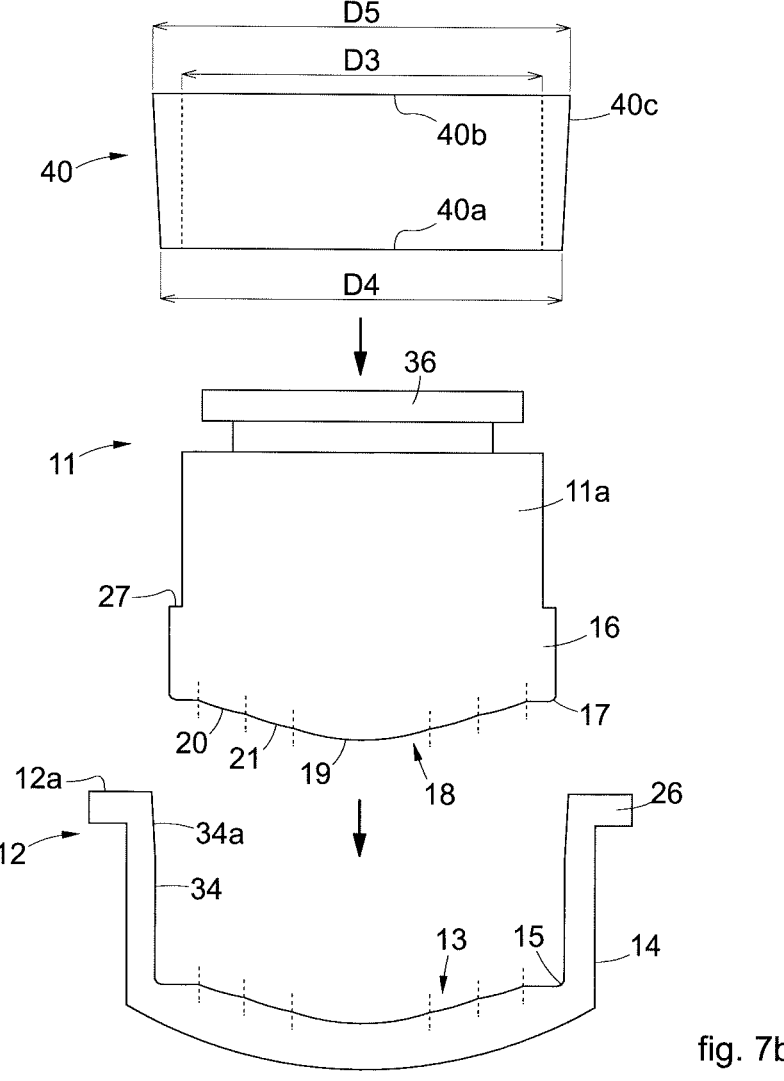

FIGS. 7*a* and 7*b* show a variant of the mold 10 which, in addition to the male element 11 and the female element 12, also comprises an annular support element 40. It provides a front edge 40*a* and a rear edge 40*b*, preferably parallel to each other. The front edge 40*a* is, during use, oriented toward the female element 12.

The support element 40 is preferably made of plastic material, for example polypropylene; however, other materials, plastic or otherwise, can be provided, as long as they are more elastically deformable than the material of the mold 10. In this way, the support element 40 acts in some way as a packing between the male element 11 and the female element 12, to the advantage of a better coupling between them. Another advantage of such a support element 40 is that it protects the male 11 and female 12 elements over time, while the coupling and uncoupling operations are repeated. In fact, during these operations a friction operates between the support element 40 and the female element 12, made of harder and more resistant material. This causes the support element to wear out, and not the mold itself.

The support element 40 is configured to be inserted around the male element 11, in particular around a rear portion 11*a* thereof. By rear portion 11*a*, we mean the portion of the male element 11 in which there is not provided the convexity which then gives its shape to the internal surface of the lens 100 to be formed.

As stated, the support element 40 is annular in shape, and has an internal diameter D3 suitably equal to the external diameter of the rear portion 11*a* of the male element 11, in order to create a coupling by interference.

Advantageously, the positioning element 16, in particular if it is conformed as a raised wall, also provides a second abutment edge 27, opposite the abutment edge 17 which interacts with the positioning mean 15 of the female element 12. The second abutment edge 27 advantageously protrudes with respect to the rear portion 11*a* of the male body 11. In this way, the support element 40 is inserted around the rear portion 11*a* until its front edge 40*a* abuts against the second abutment edge 27 (FIG. 7*a*).

The support element 40 is configured to act as a support for the male element 11 inside the female element 12. In particular, the support element 40 is configured to interfere with at least part of the internal wall of the female element 12 and thus stabilize the positioning of the male element 11.

For this purpose, it is preferable to provide that the support element 40 has a truncated cone shaped external lateral surface 40*c*, so that its diameter D4 in correspondence with the front edge 40*a* is smaller than its diameter D5 in correspondence with the rear edge 40*b*. It can be deduced that the convergence of the cone section is oriented toward the female element 12 which has the internal wall 34 with which the support element goes to interfere.

It can be observed that, in this case, an internal surface 34 of the female element 12, opposite the external wall 14, has a rear portion 34a (that is, in correspondence with its aperture, opposite the concave surface 13) which is also inclined, in such a way as to couple with the external wall 40c of the support element 40.

Obviously, it is possible to provide that the diameters D4 and D5 are equal to each other, or that the external wall 40c of the support element 40 is cylindrical in shape.

In FIG. 7a, the support element 40 is shown partly inserted inside the female element 12; however, it is possible to provide that it is totally inserted inside the female element 12. More preferably, the height of the support element 40 is equal to the distance between the second abutment edge 27 and the rear edge of the female element 12, so that once the support element 40 has been inserted inside the female element 12, its rear edge 40b is substantially aligned with a rear edge 12a of the female element 12. Please note that the rear edge 12a of the female element 12 is provided with a transverse flange which can act as a gripping element and/or as a strengthening part 26.

In the example shown, a handgrip 36 is provided which is conformed as a handle which extends longitudinally from the male element 11. In this way, an easy insertion of the support element 40 around the rear portion of the male element 11 is allowed. The handgrip 36 is optional, however. In this variant, therefore, the support element 40 is inserted around the male element 11 and inside the female element 12.

Figure 8A:
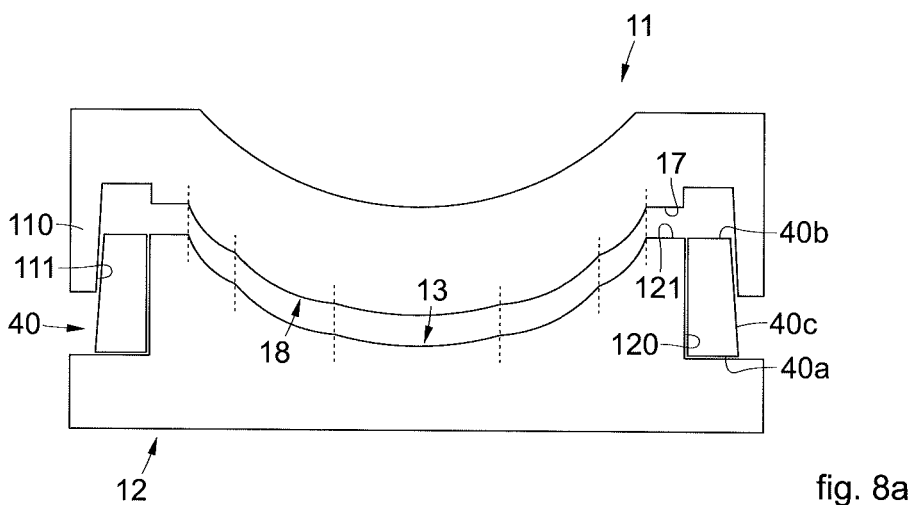
FIGS. 8a and 8b are front views of another variant of the mold, FIG. 8a being a section view and FIG. 8b being an exploded view.
Figure 8B:
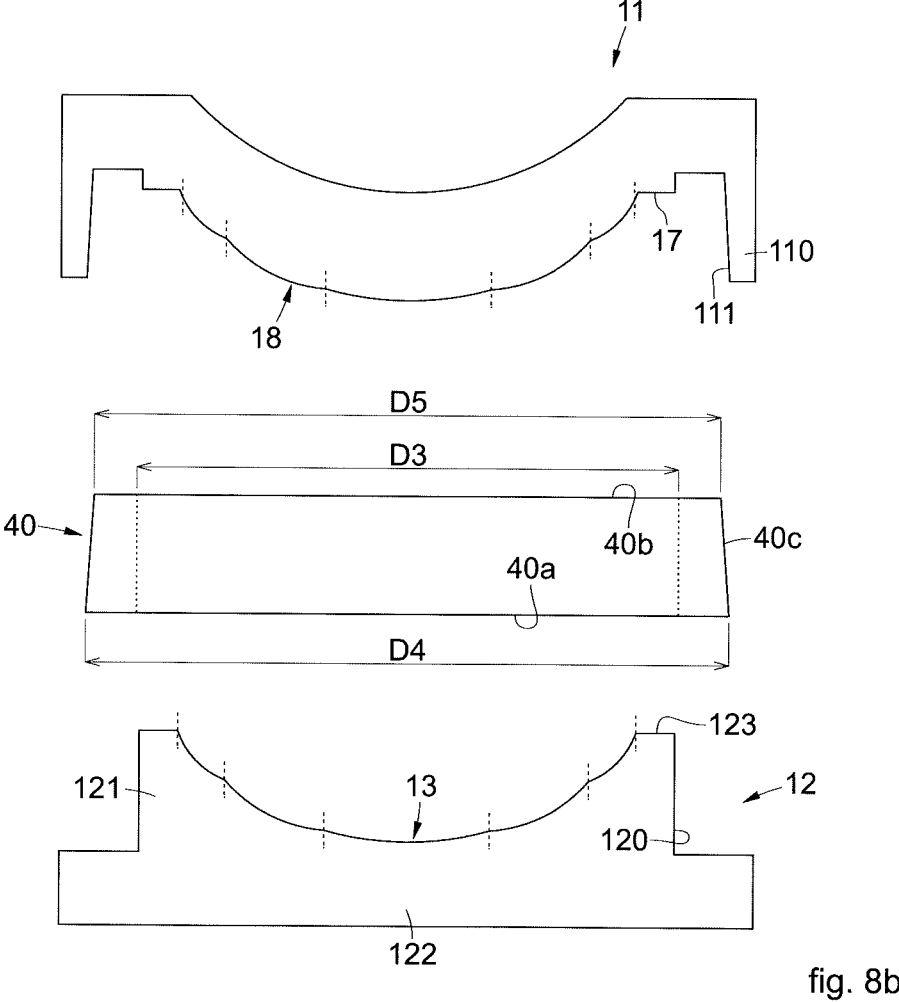

FIGS. 8a and 8b instead show another variant, which also provides a support element 40 but which, instead of being inserted around the male element 11, is inserted around the female element 12, the body of which is equipped with an external lateral wall 120 that extends beyond the concave surface 13. In other words, the concave surface 13 is made in a cylindrical body 121 that extends from a base 122. The external lateral wall 120 is the external lateral wall of the cylindrical body 121.

The external lateral wall 120 has a substantially circular section with a diameter equal to the internal diameter D3 of the support element 40.

Please note that, in this variant, the diameter D4 of the support element 40 in correspondence with its front edge 40a, which is always oriented, during use, toward the female element 12, is larger than its diameter D5 in correspondence with its rear edge 40b, opposite the front edge 40a (FIGS. 8a and 8b). Therefore, in this variant, the convergence of the cone section is oriented toward the male element 11.

In order to be supported by the support element 40, the male element 11 is provided with a perimeter wall 110 which extends around the convex surface 18, that is, which is oriented during use toward the female element 12 in such a way as to be able to be inserted around the support element 40 (FIG. 8a).

The perimeter wall 110 has an internal surface 111, oriented toward the convex surface 18 and intended to come into contact with the support element 40, with a truncated cone shape with convergence oriented upward, that is, in the opposite direction to the female element 12. In this way, the internal surface 111 of the perimeter wall 110 adapts well to the external shape of the support element 40 (FIG. 8a) and guarantees an optimized support.

The perimeter wall 110 extends from the body of the male element 11 at a predetermined distance with respect to the abutment edge 17, in particular at a distance substantially equal to the thickness of the support element 40 in correspondence with its rear edge 40b. In this way, the internal surface 111 comes into contact with the external surface 40c of the support element, creating a same-shape coupling, and at the same time the abutment edge 17 comes into contact with an edge 123 of the female element 12 located around the concave surface 13 and oriented substantially perpendicular to the external wall 120. In this variant, therefore, the support element 40 is inserted around the female element 12 and inside the male element 11.

Some embodiments described here also concern a method to manufacture a re-usable mold 10 for forming contact lenses 100. The method provides to make grooves 23 in an external zone 20 of a convex surface 18 of the male element 11. The grooves 23 are mating with, that is, they substantially have the same shape and sizes as, functional elements in relief 101 to be made on the surface of the lens 100.

According to one embodiment, the method provides to make, in correspondence with the external zone 20' of the concave surface 13 of the female element 12 of the mold 10, at least one projecting element 25. The method can provide that the projecting element 25 has shape and sizes mating with at least one recessed element 103 (FIG. 6a) to be made on the front surface of the lenses 100. The method also provides to make concave elements 24 on an internal zone 19 of the convex surface 18 of the male element 11. The concave elements 24 are mating with, that is, they substantially have the same shape and sizes as, constructive elements 102 to be made on the surface of the lens 100.

The elements 11 and 12 cooperate to define a cavity suitable to accommodate monomeric and/or polymeric material in the liquid state intended to form the lens 100.

Preferably, the method can provide to make the grooves 23 and the concave elements 24 by means of laser processing, in particular a femtosecond laser.

According to possible embodiments, the method provides to obtain the male element 11 and the female element 12 by means of molding techniques within a forming matrix of metal material with shape and size complementary to those of the molds to be obtained.

In this case, it is preferable to perform a laser processing of at least one internal surface of the matrix, in particular one or more surfaces that will give a particular desired conformation to the male element 11, for example to obtain the grooves 23 and the concave elements 24.

For this purpose, it can be provided to make, in the forming matrices, a multitude of protrusions which will form both the grooves 23 as well as the concave elements 24 of the male element 11. These protrusions advantageously have the same shapes and sizes already indicated for the grooves 23 and the concave elements 24, and are present in equal number.

Similarly, it can be provided to make a recess in the forming matrix of the female element 12 that will form the projecting element 25, if provided. Alternatively, the projecting element 25 can be manufactured by means of precision mechanical processing, for example turning.

According to some variants, the method provides to obtain the elements 11 and 12 of the mold 10 of polymeric material by means of additive printing techniques, or by means of precision mechanical processing, for example turning, milling or a combination thereof.

Regardless of the technique to manufacture the male 11 and female 12 elements, it is provided to carry out the laser processing directly on the male element 11 or on the forming matrix of this element.

According to some embodiments, the method provides to make the mold 10 of polymeric material resistant to laser, to high temperatures and wear, in which by laser resistant material it is meant a material suitable to be worked using laser.

For example, the polymeric material can be PEEK, Teflon or RADEL polyphenylsulfone. PEEK and Teflon are particularly preferred, since they are very rigid and hard, and therefore much less subject to wear.

The method provides to use adequate times of insertion of the material, polymeric or monomeric, inside the mold 10, suitable to allow the material to uniformly and completely fill the grooves 23 and the concave elements 24.

It is clear that modifications and/or additions of parts may be made to the mold of polymeric material for contact lenses 100 and to the method to manufacture the mold 10 as described heretofore, without departing from the field and scope of the present invention, as defined by the claims.

It is also clear that, although the present invention has been described with reference to some specific examples, a person of skill in the art shall certainly be able to achieve many other equivalent forms of mold 10 and manufacturing method, having the characteristics as set forth in the claims and hence all coming within the field of protection defined thereby.

In the following claims, the sole purpose of the references in brackets is to facilitate reading and they must not be considered as restrictive factors with regard to the field of protection defined by the same claims.

The invention claimed is:

1. Method to manufacture a mold for forming contact lenses, comprising a male element and a female element, respectively with a convex surface and a concave surface, defining a cavity accommodating monomeric and/or polymeric material in the liquid state intended to form said lens, wherein said convex surface and said concave surface have at least two concentric zones, one internal and the other external, with radii of curvature different from each other and of wherein the method includes laser processing: in the external zone of said convex surface, a plurality of grooves having a shape and size mating with functional elements in relief to be made on the surface of said lenses, in the internal zone of said convex surface, a plurality of concave elements being of a shape mating with constructive elements in relief to be made on the surface of said lenses, wherein the concave elements are configured as blind holes or similar cavities.

2. Method as in claim 1, wherein it provides to manufacture said elements by means of a molding technique within a metal forming matrix with a shape correlated to the convex surface of the male element and to the concave surface of the female element.

3. Method as in claim 1, wherein said laser processing is a processing that uses a femtosecond type laser and it is performed directly on the male element of the mold.

4. Mold made of monomeric and/or polymeric material for forming contact lenses equipped with functional elements in relief, comprising a male element provided with a convex surface and a female element provided with a concave surface, cooperating to define a cavity accommodating monomeric and/or polymeric material in the liquid state intended to form the lens, said mold comprising said convex and concave surfaces each have at least an internal zone and an external zone, which are concentric and have different radii of curvature from each other, wherein said external zone of said convex surface comprises a plurality of grooves with a shape and size mating with said functional elements in relief to be made on the surface of said lenses, wherein said internal zone of said convex surface comprises a plurality of concave elements of a shape mating with constructive elements in relief to be made on the surface of said lenses, and wherein the concave elements are configured as blind holes or similar cavities.

5. Mold as in claim 4, wherein said radius of curvature of the external zone is larger than the radius of curvature of the internal zone and in that the difference between said radii of curvature is between 1 and 6 mm.

6. Mold as in claim 4, wherein said convex and concave surfaces have three zones, each one concentric with respect to the other with respect to a central axis of said mold, having respective radii of curvature different from each other, wherein said zones comprise an intermediate zone having a radius of curvature of transition between said internal zone and said external zone, said radius of curvature of the intermediate zone being larger than the radius of curvature of the internal zone and in that the difference between said radii of curvature is between 2 and 7 mm.

7. Mold as in claim 4, wherein said grooves have a length between 350 µm and 1000 µm, a width between 80 µm and 450 µm, a constant height between 5 µm and 25 µm, and the number of said grooves is between 2 and 340.

8. Mold as in claim 4, wherein said grooves are homogeneously distributed respectively on the entire external zone of said convex surface, according to a regular geometric pattern defined by a plurality of rows radiating from a central axis of said mold.

9. Mold as in claim 4, wherein said grooves are in the shape of one parallelepiped part or two separate parallelepiped parts, or two separate circular parts.

10. Mold as in claim 4, comprising, in correspondence with said external zone of said concave surface, at least one projecting element having a shape and size mating with at least one recessed element to be made on the front surface of said lenses, positioned in correspondence with a zone of separation into two distinct parts of said functional elements in relief.

11. Mold as in claim 4, comprising a tubular support element inserted around one of either the male element or the female element and configured to interfere with at least part of an internal wall of the other one of either the male element or the female element.

12. Mold as in claim 11, wherein the support element has an external lateral surface with a truncated cone shape with convergence oriented toward the internal wall with which it is configured to interfere.

13. Mold as in claim 12, wherein the internal wall, with which the support element is configured to interfere, has an inclined portion so as to couple with the external surface of the support element.

14. Mold as in claim 11, wherein the support element is made of polypropylene.

15. Method as in claim 1, wherein the blind holes or similar cavities have micrometric size.

16. Method as in claim 1, wherein the functional elements are configured as sensors configured to detect the presence of a determinate physiological parameter in the tear fluid.

17. Method as in claim 1, wherein the functional elements are configured as a reservoir containing a liquid which is gradually released into the eye to carry out a slow-release treatment.

18. Mold as in claim 4, wherein the blind holes or similar cavities have micrometric size.

19. Mold as in claim 4, wherein the functional elements are configured as sensors configured to detect the presence of a determinate physiological parameter in the tear fluid.

20. Mold as in claim 4, wherein the functional elements are configured as a reservoir containing a liquid which is gradually released into the eye to carry out a slow-release treatment.

* * * * *